United States Patent [19]

Slingluff et al.

[11] 3,749,134
[45] July 31, 1973

[54] RADIOGRAPHICALLY OPAQUE PLASTIC TUBING

[75] Inventors: Eugene L. Slingluff, East Troy; Eli Ostoich, Milwaukee, both of Wis.

[73] Assignee: Sunlite Plastics, Inc., Milwaukee, Wis.

[22] Filed: Feb. 2, 1972

[21] Appl. No.: 222,983

[52] U.S. Cl. ............... 138/177, 128/348, 128/349, 138/118, 250/108 FS, 252/478, 260/475 P, 260/31.4, 424/5
[51] Int. Cl. ..................... F16l 11/06, G21f 1/10
[58] Field of Search ........................... 128/348, 349; 138/118, 177; 252/478; 250/108 FS; 260/475 P; 424/5; 161/139

[56] References Cited
UNITED STATES PATENTS

| | | | |
|---|---|---|---|
| 2,247,880 | 7/1941 | Guerbet | 252/478 |
| 3,361,700 | 1/1968 | Archer et al. | 252/478 |
| 3,573,215 | 3/1971 | Nametz et al. | 260/475 P |
| 3,645,955 | 2/1972 | Flynn | 128/348 |

*Primary Examiner*—George F. Lesmes
*Assistant Examiner*—Charles E. Lipsey
*Attorney*—Andrus, Sceales, Starke & Sawall

[57] ABSTRACT

Flexible radiographically opaque plastic tubing for use as an X-ray catheter. The tubing is transparent to visible light and is rendered X-ray opaque by the incorporation of a diol of tetrabromophthalic anhydride. The radiographically opaque properties enable the tubing to be used as a catheter whose position within the body cavity can be determined by X-ray observation.

7 Claims, No Drawings

RADIOGRAPHICALLY OPAQUE PLASTIC TUBING

BACKGROUND OF THE INVENTION

In certain type of medical procedures catheters are inserted within the body cavity and it is often necessary to be able to precisely determine the location of the free or distal end of the catheter within the body. The usual manner of determining the position of the catheter is by X-ray observation. This is accomplished by employing a catheter that is partially or wholly opaque to X-rays, and through X-ray observation the position of the catheter within the body cavity can be determined.

In the past, a number of different types of X-ray opaque catheters have been proposed. Attempts have been made to develop an X-ray opaque catheter by applying or painting X-ray opaque substances on the outer surface of the catheter. However, X-ray opaque markings of this type are often destroyed or rendered relatively ineffective through cleaning or sterilization of the catheter. Furthermore, many X-ray opaque substances cannot be used as an external coating due to their toxicity to body tissue.

In other cases an X-ray opaque material has been incorporated within the plastic tubing to thereby render the entire wall of the tubing X-ray opaque. In most instances, however, the resulting catheters have been opaque not only to X-rays, but also to visible light. If the plastic tubing is opaque to visible light, substances flowing through the tubing cannot be visually observed which is a decided disadvantage.

In order to overcome the inherent disadvantages of a catheter which is opaque to visible light, it has also been proposed to incorporate a narrow strip of X-ray opaque material within the wall of the catheter so that the major portion of the catheter wall would be transparent to visible light. This procedure not only increases the cost of fabrication, but reduces the width of the X-ray opaque substance, and when dealing with catheters of small diameter, the narrow X-ray opaque strip is difficult to observe by fluoroscope or X-ray film.

SUMMARY OF THE INVENTION

The invention relates to a flexible plastic tube to be used as an X-ray catheter which is transparent to visible light and yet is radiographically opaque. The tubing is fabricated of a thermoplastic resin containing one or more plasticizers to provide the desired hardness and is rendered radiographically opaque by the incorporation of a diol of tetrabromophthalic anhydride.

As the tubing is X-ray opaque, its position within the body cavity can be readily determined by X-ray observation or fluoroscope. While radiographically opaque, the tubing is clear or transparent to visible light so that substances flowing through the tubing can be readily observed.

The diol can be distributed throughout the entire wall of the tubing, thereby rendering the entire tube radiographically opaque, or alternately, the diol can be incorporated in certain areas or zones of the tubing to form a longitudinally extending strip, or other desired patterns.

The use of the diol to provide the X-ray opaque characteristics eliminates the need for conventional X-ray opaque compounds, such as bismuth salts or iodine compounds, which in some cases cannot be tolerated by the body tissue.

DESCRIPTION OF THE PREFERRED EMBODIMENT

The plastic tubing of the invention is a flexible non-absorptive, non-toxic material formed of a thermoplastic resin, one or more plasticizers, and a small amount of a diol of tetrabromophthalic anhydride having the following formula:

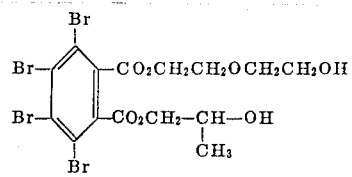

The diol is a substantially colorless liquid having a hydroxyl number of 162, an equivalent weight of 346, an acid number of 0.63 and contains 45.5 percent bromine.

The particular thermoplastic resin to be employed in the tubing is not critical to the invention and any of the common thermoplastic resins can be utilized, such as polyethylene, vinyl polymers such as vinylchloride polymers or copolymers with other vinyl esters such as vinyl acetate, vinylidene chloride polymers, flexible forms of nylon, flexible polyurethane, and the like.

It is preferred that the plastic material be unpigmented so that it is transparent to visible light, making it possible to see the flow of substances within the tubing. However, it is possible to include a small amount of pigment in the resin formulation to provide a tint to the tubing while still maintaining the transparent characteristics.

The specific plasticizer to be employed in the composition is not critical to the invention and any of the conventional plasticizers commonly used in formulating thermoplastic compositions can be utilized, such as di(-2–ethyhexyl) phthalate, dioctyl phthalate, diisooctyl phthalate, diethyl phthalate, dioctyl adipate, diphenyl 2–ethyl hexyl phosphate, ethyl phthalyl ethyl glycolate, butyl phthalhyl butyl glycolate, butyl benzyl phthalate, and the like.

The amount of plasticizer depends on the desired hardness or rigidity in the tubing, and if the tubing is to be employed as a catheter, it is desired that the tubing be relatively soft and flexible. In general, the more flexible types of tubing will have a Shore A durometer hardness of 45 to 90, while more rigid types of the plastic tubing may have a Shore D durometer hardness of 77 to 83. In general, the plasticizer us used in an amount of 5 percent to 100 percent by weight of the thermoplastic resin.

The diol provides radiographically opaque properties for the thermoplastic composition, and yet due to the fact that it is colorless will not render the plastic composition opaque to visible light.

It is preferred to blend the diol in with the thermoplastic composition and thereafter extrude the composition in the form of tubing so that the tetrabromophthalic anhydride is distributed throughout the entire tubing wall. However, in certain instances the diol can be incorporated only in portions of the wall of the tubing, as for example, as a longitudinal stripe which extends the length of the tubing, or the diol can be incorporated in any other desired pattern along the length of the tubing. In either case the portion of the tubing which contains the diol will be opaque to X-rays so that it can be readily seen by X-ray observation when in the body cavity.

The thermoplastic composition containing the diol can be prepared by conventional procedures. In general, the plasticizers and the diol are blended into the resin and generally a small amount of powdered lubricant such as zinc stearate is also incorporated. The thoroughly blended mixture is then extruded in the form of tubing by conventional extrusion equipment.

The amount of the diol to be incorporated in the thermoplastic composition can vary within wide limits depending on the degree of radiographic opacity required and also depending on the wall thickness of the tubing. In general, the diol can be employed in the amount of 5 percent to 70 percent by weight of the thermoplastic resin composition (including the resin and plasticizers) and preferably in the amount of 15 percent to 40 percent by weight of the thermoplastic resin composition. For tubing of thicker wall section, a lesser proportion of the diol is required because of the increased concentration of the material in the thicker wall.

The following examples illustrate the manner of preparing the X-ray opaque tubing of the invention:

EXAMPLE NO. I 100 parts by weight of polyvinyl chloride were blended with 44 parts of di(2-ethylhexyl) phthalate, 20 parts of epoxidized linseed oil, and 12 parts of the previously identified diol of tetrabromophthalic anhydride. In addition, 0.08 gr. of violet pigment was added to the mixture to provide a bluish cast, and 2 oz. of zinc stearate was incorporated as a lubricant.

The resulting blend was extruded from a standard extrusion machine having a machine body temperature of 325° F. The extruded tubing had an ID of 0.200 inch and an OD of 0.360 inch, and a Shore A durometer hardness of 78. The tubing had a faint blue cast, was transparent to visible light, but radiographically opaque.

EXAMPLE NO. II 100 parts by weight of polyvinyl chloride were blended with 44 parts of di(2-ethylhexyl)phthalate, 20 parts of epoxidized linseed oil, and 24 parts of the previously identified diol of tetrabromophthalic anhydride. In addition, 2 oz. of zinc stearate was incorporated as a lubricant.

The resulting blend was extruded from a standard extrusion machine having a machine body temperature of 325° F. The extruded tubing had an ID of 0.060 inch and an OD of 0.092 inch, and A Shore A durometer hardness of 78. The tubing was clear and transparent to visible light, but radiographically opaque.

Various modes of carrying out the invention are contemplated as being within the scope of the following claims particularly pointing out and distinctly claiming the subject matter which is regarded as the invention,

I claim:

1. A hollow flexible plastic tube fabricated from a thermoplastic resin composition and having corporated therein an amount of a material sufficient to render the tube radiographically opaque, said material having the formula:

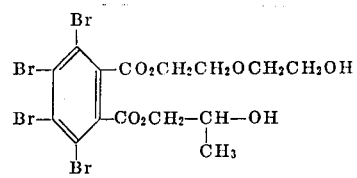

, said tube being transparent to visible light.

2. The tube of claim 1, wherein said material is present in an amount of 15 to 40 percent by weight of the composition.

3. The tube of claim 1, wherein said material is distributed throughout the entire wall of said tube.

4. The tube of claim 1, wherein said resin composition comprises a thermoplastic resin and a plasticizer, said plastizer comprising from 5 percent to 100 percent by weight of said resin.

5. A catheter whose position within a body cavity can be determined by X-ray observation which comprises a flexible thermoplastic tube having incorporated within the wall thereof a material being the formula:

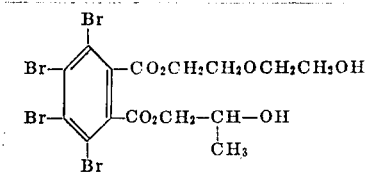

, said material being present in an amount sufficient to render the tube X-ray opaque, said tube being transparent to visible light.

6. The catheter of claim 5, in which the material is distributed through the entire wall of the tube, whereby the entire circumference of the tube is X-ray opaque.

7. The catheter of claim 5, in which the tube has a Shore A durometer hardness of 45 to 90.

* * * * *